United States Patent
Fischer et al.

[15] 3,657,092
[45] Apr. 18, 1972

[54] PROCESS FOR ELECTRODEPOSITION

[72] Inventors: Hannes Fischer, Wiesbaden-Biebrich; Alfred Kuhlkamp, Hofheim/Tanus, both of Germany

[73] Assignee: Chemische Werke Albert, Wiesbaden-Biebrich, Germany

[22] Filed: Aug. 18, 1969

[21] Appl. No.: 851,094

[30] Foreign Application Priority Data

Aug. 20, 1968 Germany..................P 17 96 033.9

[52] U.S. Cl................................................204/181
[51] Int. Cl..................................................B01k 5/02
[58] Field of Search...................C23b/13/00; 204/181

[56] References Cited

UNITED STATES PATENTS

| | | |
|---|---|---|
| 3,455,806 | 7/1969 | Spoor et al..................204/181 |
| 3,476,668 | 11/1969 | Scheiber et al...............204/181 |
| 3,497,440 | 2/1970 | Weigel..........................204/181 |

Primary Examiner—Howard S. Williams
Attorney—Littlepage, Quaintance, Wray & Aisenberg

[57] ABSTRACT

A process for electrodepositing a water-insoluble synthetic condensation resin having a particle size of at least $0.1\,\mu$ and generally at most $30\mu$ from a suspension of said resin in an aqueous medium onto the surface of an electrically conductive article. Preferred resins are phenolic resins, polyester resins and polyamide resins. In a specific embodiment polyvinyl phosphonic acid or its sodium salt or phosphoric acid either alone or in combination may be used as additives. The electrodeposited coatings may be stoved at a temperature above the softening temperature of the resin. Articles coated by this process.

10 Claims, No Drawings

PROCESS FOR ELECTRODEPOSITION

This invention relates to a process for the electrophoretic deposition of synthetic resins on electrically conductive objects, wherein the resins are used as suspensions in water, which may contain wetting agents or emulsifying agents.

Processes are known for electrodepositing polymerization resins and ammonium salts of alkyd resins from aqueous media onto electrodes in the presence of an electric field. The electrodes are suspended in the aqueous media and the coating is formed on the electrode which carries an electric charge opposite to the synthetic resin particles.

As compared with other techniques of applying surface coatings electrodeposition has the advantage that the whole surface of the electrode, particularly on the edges and in hollow spaces, is coated; the good utilization of the resin ensures that the processes are very economical.

A disadvantage of electrodeposition processes is that aqueous synthetic resin solutions are of low stability to hydrolytic and oxidative degradation of the synthetic resins and such degradation results in a deterioration of the quality of the coat applied. Additionally the measures which have to be taken to achieve watersolubility of the resin, e.g., the incorporation of a certain proportion of carboxyl groups or the use of a low molecular weight resin, have an unfavourable effect on the characteristics of the coatings. The coatings thus prepared are in addition in many cases not sufficiently water and chemical-resistant.

Processes have also been proposed in which, using direct current, polymer particles have been deposited on electrically conductive objects from polymer dispersions containing the polymer particles e.g., polyethylene and styrene-containing polymers in very finely divided form, or from rubber latices; however, these processes are restricted to those synthetic resins which can be used in the form of dispersions or latices.

In one proposed embodiment of this process, by adding organic or inorganic substances which form complexes with the metal ions formed during the deposition process, the complexes having the same electrical charge as the synthetic resin particles, the precipitation of the dispersions by metal ions is prevented.

It has further been proposed to prepare aqueous dispersions of finely divided polyethylene with particles sizes from 3 to 4 $\mu$ using water-soluble ammonium or amino salts of an alkyl-styrene-maleic acid polymer as emulsifiers. This process is, however, restricted to polyethylene.

The present invention aims to mitigate the disadvantages of the known processes.

According to the present invention there is provided a process which comprises electrodepositing a synthetic, water-insoluble condensation resin from a suspension of solid particles of said resin in an aqueous medium onto the surface of an electrically conductive article the particles having a size of at least 0.1 $\mu$ and suitably at most 30 $\mu$, preferably of 0.2 $\mu$ to 10 $\mu$. The synthetic, condensation resin is preferably a phenolic resin, a polyester resin or a polyamide or a mixture of these resins.

The particular advantage of the process according to the invention is that water-insoluble synthetic resins which are stable to hydrolysis under the conditions of coating can be used so that the coating system remains chemically unchanged for a long time and at any time can be brought into a condition ready for use by simply stirring the suspension. If suspensions of the synthetic condensation resins are employed in the process according to the invention it is not necessary to make any restriction as regard the viscosity and acid number of the resins used as is the case when using water-soluble resins in true solutions. In spite of this, better films are obtained by use of the process according to the invention. As compared with electrophoretic coating using water soluble synthetic resins, a higher coating speed is also obtained with the process according to the invention.

Suitable synthetic resins are for example phenolic resins, polyamides such as polycaprolactam, polyhexamethylene adipamide, poly-$\beta$-lactams and higher polyamides such as polyundecanoamide, epoxy resins and polyester resins. Both resols and novolaks are suitable as phenolic resins, provided that they have a melting point of at least about 60° C. Polyester resins which can be used are saturated and/or unsaturated polyesters, for example those based on aromatic or aliphatic carboxylic acids with up to 18 C-atoms, in particular di- and polycarboxylic acids, such as phthalic acid, terephthalic acid, isophthalic acid, adipic acid, sebacic acid, maleic acid, fumaric acid, if desired together with monocarboxylic acids e.g., saturated or unsaturated fatty acids such as conventionally used for preparing alkyd resins e.g., fatty acids of drying or non-drying oils, conjugated fatty acids or the like. However, it is desirable to ensure that the proportion of the acids with more than eight C-atoms does not represent more than 50 percent by weight of the polyester, so that the softening point is not below about 50° C.

The alcohol components of the polyester can also be varied as desired. Suitable polyhydric alcohols are e.g., ethylene glycol, diethylene glycol, glycerol, trimethylolethane, trimethylolpropane, dimethyl propane diol, butane diols, hexane diols, if desired together with monohydric alcohols such as ethylene glycol monobutylether.

The proportion of the alcohol component also depends on the number of C-atoms. Here basically the same applies as stated in connection with the acids. In addition, polyesters can be used which still contain copolymerisable, olefinically unsaturated monomers.

It is desirable to use polyesters with an acid number below 60, preferably below 45.

Suitable resins are also amine resins e.g., melamine and/or urea resins. However, these resins are preferably used in admixture with the other synthetic resins.

The suspensions to be used according to the invention include those systems which even externally can be seen to be two phases. This means coarse-dispersed systems, i.e., systems in which the resins have a particle diameter above the colloidal range, i.e., of more than $10^3$ Angstrom-units (0.1$\mu$). It is advantageous for the synthetic resin powder used to have a particle diameter more than 200 m$\mu$ and not in excess of 30$\mu$, preferably not in excess of 10$\mu$.

As a small synthetic resin particle size is important for the preparation of the suspensions, those synthetic resins are particularly suitable for the process of the invention which can be comminuted to the aforementioned particle size or which from the start can be prepared in such a finely divided form and which in pulverized or powdered form do not tend under the conditions of the process towards an increase in particle size above the aforementioned upper values through agglomeration.

The process is advantageously performed at room temperature, but higher temperatures e.g., up to about 50° C. can also be used. However, it is essential that the process of the invention is performed at below the softening temperature of the synthetic resin. Working at at least 10° C., preferably at least 20° C. below the softening point of the synthetic resin used is advantageous.

Contrary to known processes according to the present process there are used no solubilising agents, bases or complex forming agents. It is advantageous to use cationic, anionic or non-ionic wetting agents. Mixtures of different wetting agents may be used. When adding cationic wetting agents, the synthetic resin particles acquire a positive electric charge and when using anionic or non-ionic wetting agents a negative electric charge results. The wetting agent is suitably used in quantities of 0.01-5 percent by weight, preferably 0.05-3 percent by weight, calculated on the weight of synthetic resin powder.

Suitable anionic wetting agents are e.g., alkali metal salts of higher fatty acids, alkyl sulphates or alkyl sulphonates containing long-chain alkyl groups, aryl sulphonates, monoglyceride sulphates, hydroxyalkylamidosulphates, condensation products of higher fatty acids with hydroxy- or aminoalkane sulphates, sulphonated fatty acids and their alkyl or amide derivatives. As non-ionic wetting agents are suitable e.g. polyethylene glycol ethers, alkylphenol glycol ethers e.g. nonylphenol polyglycol ether, reaction products of alkylene oxides such as ethylene oxide or propylene oxide with higher molecular fatty acids, fatty alcohols, alkyl phenols, polyhydroxy compounds such as cellulose derivatives, oligosaccharides, sugar alcohols or polyalkylolamines and polyimines. Further suitable wetting agents are e.g. alkylsuccinic acid esters containing higher alkyl groups, or if desired mixtures of these substances. It has further been found that improved results are obtained if the process of the present invention is carried out in the presence of polyvinyl phosphonic acid, its sodium salt or phosphoric acid or a combination thereof. By this mode of operation coatings with a particularly smooth surface are obtained. IN addition, an improved coating is obtained on the side of the objects to be coated which face away from the counterelectrode.

The polyvinyl phosphonic acid, its sodium salt, phosphoric acid or mixtures of these substances is advantageously employed in quantities of 0.1 to 5 percent by weight, preferably 0.5 to 2 percent by weight, based on the synthetic resin powder. The additive can be added to the system before or after the preparation of the suspension of synthetic resin powder in water. It is also possible to add it in several portions.

The suspensions used in the process of the invention are advantageously prepared by agitating or stirring the components of the suspensions. For the preparation of the suspensions by stirring those stirring devices are particularly suited in which the phases to be mixed are subjected to high shearing forces. This can, for example, be achieved by passing the mixture at very high speed through suitably arranged narrow gaps. This process ensures that agglomerates of particles of the solid phase are thoroughly comminuted. The suspensions may contain 2–50 percent by weight, preferably 5–25 percent by weight of the synthetic resin powder, based on the total suspension.

For performing the process of the invention electrically conductive objects are immersed in these suspensions, and a voltage is applied between the objects and a counterelectrode by a direct current source of such value that the current density, measured in milliamps per cm$^2$, on the electrode to be coated is between 0.1 and 30, preferably between 0.2 and 15. Suitable voltages for the process of the invention are between e.g. 5 and 200 V, preferably between 50 and 150 V.

The process according to the invention permits the application of coatings more than 100$\mu$ thick, and the thicknesses of the coatings may be varied convenient variations to the voltages and coating. In this way coating thicknesses of e.g. up to 2,000$\mu$, preferably up to 1,000$\mu$ and in particular up to 200$\mu$ can be prepared.

As the coating process according to the invention must be performed at below the softening temperature of the synthetic resins it is necessary to fuse the coating to a smooth film by heating to temperatures above the softening temperature of the synthetic resins used. Thus, after the coating process the coated objects are heated for a certain time e.g., 10 to 60 minutes, preferably 20 to 30 minutes to a temperature above the softening temperature.

The process according to the invention is also suitable for the preparation of pigmented coatings, if instead of synthetic resins mixtures of synthetic resin powders and pigment powders are used. It is also possible to use synthetic resin powders which already contain pigments. These powders can be produced by stirring pigment powders into the melted synthetic resin, cooling the melt and grinding the product obtained.

It is also possible to use polyvinylphosphonic acid, its sodium salt or phosphoric acid — particularly in the presence of polymers of olefins, having more than two carbon atoms, for example homo- and copolymers of propylene or higher-$\alpha$-olefins, or acrylic resins, also if desired those which are curable. In the presence of the said phosphorus compounds good results are even obtained with polyethylene.

Coatings prepared according to the process of the invention from many different types of synthetic resin can be used for very varied purposes e.g., for coating metal such as for household articles, cookers, stoves, washing machines, containers (tins), vehicles, in particular car bodies, machine parts, metal structural parts e.g., window or door frames, railings, shelves, road markings, or signs. The process is particularly suitable for the coatings of objects having undercuts because the throwing power is very good. Therefore completely satisfactory coating is ensured, the surface and adhesion of which is further improved by any subsequent heat treatment.

EXAMPLE 1

Ten g of polyundecanoamide in powder form, the particle size of which does not exceed 30$\mu$ are suspended by intensive stirring for 30 minutes with an Ultra-Turrax high speed stirrer in a solution of 0.2 g of an alkylphenol polyglycol ether (prepared by the addition of 6–8 mol of ethylene oxide to 1 mol of nonylphenol) and 0.2 g of sodium lauryl sulphate in 90 g of distilled water.

Two bare steel sheets are immersed in this suspension so that, in each case, 25 cm$^2$ of the surface of sheets are covered by the suspension. One of the sheets is arranged as the cathode and the other as the anode. A D. C. voltage of 50 volts is applied for 10 seconds, the current being 190 m-amp., and a very adhesive coating of polyamide powder having a thickness of more than 100$\mu$ is deposited on the steel which is arranged as the anode. The whole of the surface of the sheet which is immersed in the solution, particularly the edges, is completely coated. No deposition occurs on the sheet serving as the cathode.

By stoving the coated sheet at 240° C. for 10 minutes, the coat can be melted into a smooth, light yellow film.

EXAMPLE 2

By polycondensation of 19.5 g of butane-1,4-diol, 9 g of ethylene glycol monobutyl ether, 12.3 g of adipic acid and 115 g of a styrene-maleic anhydride copolymer (mol ratio 8:1 molecular weight 2400, equivalent weight calculated an anhydride = 952) a polyester is prepared having an acid number of 50 and a softening point of about 70° C. The polyester can be milled in a porcelain ball mill to a powder, the particle size of which is below 30$\mu$.

10 g of this polyester powder are suspended by intensive stirring with an Ultra-Turrax high speed stirrer in a solution of 0.1 g of an alkylphenol polyglycol ether (prepared by the addition of 6–8 mol of ethylene oxide to 1 mol of nonylphenol) and 0.1 g of sodium lauryl sulphate in 90 g of distilled water. 0.1 g of n-octyl alcohol is added to the suspension as antifoam agent.

Two bare steel sheets are immersed in this suspension so that, in each case, 25 cm$^2$ of the surface of the sheets are covered by the aqueous phase. A D.C. voltage of 150 volt is applied for 15–30 seconds, the current being 190–210 m-amp. A dense coat of polyester powder is deposited on the sheet which is arranged as the anode. This coating completely covers the surface and the edges of the sheet; the thickness of the coating exceeds 100 $\mu$.

By stoving at 170° C. for 20 minutes the coat can be melted to a smooth, glossy film.

EXAMPLE 3

Five g of a polyester powder prepared in a manner analogous to that described in Example 2 and 2.5 g of titanium dioxide are suspended by intensive stirring with an Ultra-Turrax high speed stirrer for 30 minutes in a solution of 0.1 g of an alkylphenol polyglycol ether (prepared by the addition of 6–8 mol of ethylene oxide to 1 mol of nonylphenol) and 0.1 g of sodium lauryl sulphate in 92.5 g of distilled water, 0.2 g of n-octyl alcohol are added to the suspension as anti-foam agent.

Two bare steel sheets are immersed in this suspension so that, in each case, 25 cm$^2$ of the surface of the sheets are covered by the suspension. A D.C. voltage of 100 volt is applied for 30 seconds the current being 255 m-amp. A mixture of polyester and titanium dioxide having a thickness of about 100μ is precipitated into the sheet which is arranged as anode. No deposition occurs at the cathode. The precipitate forms a very adhesive, dense layer which also covers the edges of the sheet. By stoving the coated sheet for 20 minutes at 190° C, the coat can be melted into a smooth, white pigmented film.

EXAMPLE 4

A cresol-formaldehyde resol (prepared by condensing 1.2 to 1.3 mol of formaldehyde with 1 mol of cresol) having a melting range of 85° to 90° C is milled to a particle size of 10 to 30μ. The powder contains about 95 percent of particles having a particle size of below 10 μ. 5 g of this powder are suspended in 95 g of water with addition of 0.1 g of sodium lauryl sulphate by intensive stirring for 45 minutes with an Ultra-Turrax high speed stirrer, accompanied by cooling to yield a reversible 5 percent suspension.

Two aluminium electrodes are immersed in this suspension so that, in each case, 25 cm² of the surface of the sheets are covered by the aqueous phase. A D.C. voltage of 150 volt, is applied for 30 seconds, the current being 200 m-amp; at an initial temperature of 25° to 30° C a precipitate having a thickness of more than 100μ is deposited on one electrode. This precipitate can be subsequently converted into a smooth, very adhesive, glossy film by stoving for 30 seconds at 190° C.

EXAMPLE 5

By polycondensation of 87.5 g butane diol-1,4,41 g ethylene-glycol monobutyl ether, 55.2 g adipic acid and a maleic anhydride-styrene copolymer (molar ratio styrene : maleic anhydride is 8:1) with an average molecular weight below 2500, a polyester resin is prepared during 7 hours by a reaction at a temperature of 159° to 160° C which resin having a softening point of 126° to 140° C and an acid number of 41.5. The molar ratio of the OH-groups : COOH-groups of this resin is 1.22:1. It is ground in a ball mill to a powder having a particle size not in excess of 30μ.

10 g of this powder are suspended by vigorous stirring using an "Ultra-Turrax" impeller producing a shearing action in a solution of 0.05 g of sodium lauryl sulphate and 0.15 g of an alkyl-phenol polyglycol ether in 90 g of distilled water. The polyglycol ether was made reacting 6-10 mol of ethylene oxide with one mol of nonyl phenol. 0.1 g of polyvinyl phosphonic acid and 0.1 g of octyl alcohol are added to the suspension as defoamers.

Two plane steel sheets are immersed in this solution at room temperature about 3 cm from one another in such a way that 25 cm² of their surfaces are covered by the suspension. By applying a direct voltage of 50 V for 2 minutes at a current density of about 5 mA/cm² a completely smooth layer of polyester powder is deposited on the surface of the sheet connected as the anode; the thickness of said layer exceeds 100μ. The thicknesses of the layers deposited on the front and rear sides of the steel sheet are in the approximate ratio of 2:1.

By heating for 30 minutes at 185° C this coating is melted to a smooth, glossy film.

EXAMPLE 6

Five g of the synthetic resin powder whose preparation is described in Example 5, is suspended in 95 g os distilled water containing in solution 0.025 g of sodium lauryl sulphate and 0.05 g of an alkyl-phenol polyglycol ether (prepared by reacting 6-10 mol of ethylene oxide with 1 mol of nonyl phenol) by vigorous stirring with the impeller referred to in Example 1. 0.05 g of polyvinyl phosphonic acid and 0.1 g of n-octyl alcohol are added to the finished suspension as defoamers.

Into this suspension are immersed two plane steel sheets spaced about 3 cm from one another; 25 cm² of the sheet surfaces are covered by the suspension.

By applying a direct voltage of 50 V for 2 minutes at room temperature, with a resulting current density of 6.7 to 9 mA/cm², a smooth, strongly adhering powder layer is deposited on the sheet connected as the anode, covering both sides of the steel sheet with approximately the same film thickness of more than 100μ. By heating for 30 minutes the powder is fused to a smooth, glossy coating. From the same suspension a series of at least four sheets connected as anodes could be coated in the same way one after the other.

Using the method of Examples 5 or 6, coatings are obtained whose thickness and surface characteristics, particularly on the side away from the counterelectrode, are considerably better than when no polyvinyl phosphonic acid is used.

EXAMPLE 7

Twenty g of a synthetic resin powder prepared as in Example 5 are suspended in 80 g of distilled water containing in solution 0.1 g of sodium lauryl sulphate and 0.2 g of an alkyl phenol polyglycol ether (prepared by reaction of 1 mol of nonyl phenol with 6 to 10 mol of ethylene oxide), by vigorous stirring with the impeller referred to in Example 1. To the completed suspension are added 0.1 g of polyvinyl phosphonic acid and 0.1 g of n-octyl-alcohol as defoamers.

Into this suspension are immersed two steel sheets spaced at a distance of about 3 cm from one another; 25 cm² of the sheet surfaces are covered by the suspension.

By the application of a direct voltage of 50 V for 1 minute at room temperature, at a current density of 6.4 to 9.8 mA/cm² a smooth powder-layer more than 100μ thick is deposited on the sheet connected as the anode. The ratio of the thicknesses of the coatings on the front and rear sides of the sheet is 2:1. The coating can be made by continuous heating at 185° C for 30 minutes to form a smooth glossy film.

EXAMPLE 8

Ten g of a synthetic resin powder prepared as in Example 5 are suspended in 90 g of distilled water containing in solution 0.05 g of sodium lauryl sulphate and 0.1 g of alkyl phenol polyglycol ether (prepared by reacting 6-10 mol of ethylene oxide with 1 mol of nonyl phenol) by stirring with the impeller referred to in Example 1 in 90 g of distilled water, 0.05 g of polyvinyl phosphonic acid and 0.1 g of n-octyl alcohol are added to the suspension.

Into this suspension are immersed two steel sheets spaced at a distance of about 3 cm from one another; 25 cm² of the sheet surface is covered by the suspension.

By applying a direct voltage of 105 V for a period of 30 seconds at 45° C, at a resulting current density of 9.6 to 11.8 mA/cm², a very smooth synthetic resin layer over 100μ thick is deposited on the sheet connected as the anode. The ratio of the coating thicknesses on the front and rear sides of the sheet is about 2:1.

By continuous heating for 30 minutes at 185° C the coating layer can be fused to a smooth, glossy coating.

EXAMPLE 9

Ten g of a synthetic resin powder prepared as in Example 5 are suspended by vigorous stirring with the impeller referred to in Example 1 in 90 g of distilled water containing 0.05 g of sodium lauryl sulphate and 0.1 g of an alkyl phenol-polyglycol ether (obtained by reacting 6 to 10 mol of ethylene oxide with 1 mol of nonyl phenol). 0.05 g of phosphoric acid and 0.19 g of n-octyl alcohol are added to the completed suspension as defoamers.

Into the suspension 2 steel plates were immersed spaced at a distance of about 3 cm from one another; 25 cm² of the sheet surface were always covered by the suspension.

By applying a direct voltage of 50 V for 2 minutes at a resulting current density of 6.9 to 10.4 mA/cm² a very smooth powder layer more than 100μ thick is deposited on the sheet connected as the anode, also completely covering the side of the sheet away from the counterelectrode. By heating continuously for 30 minutes at 185° C a smooth, highly glossy film is obtained.

EXAMPLE 10

Ten g of a synthetic resin powder prepared as in Example 1 are suspended by vigorous stirring with the impeller referred to in Example 1 in 90 g of distilled water containing 0.05 g of sodium lauryl sulphate and 0.15 g of an alkyl phenol polyglycol ether (obtained by reacting 6 to 10 mol of ethylene oxide with 1 mol of nonyl phenol). 0.1 g of phosphoric acid is added to the completed suspension.

Into this suspension are immersed two steel sheets spaced at a distance of about 3 cm from one another; 25 cm² of the sheet surfaces are covered by the suspension.

By applying a direct voltage of 25 V for 4 minutes at room temperature, at a current density of 5.4 to 6.8 mA/cm², a smooth powder layer more than 100μ thick is deposited on the sheet connected as the anode, also covering the anode surface facing away from the counterelectrode.

By continuous heating for 30 minutes at 185° C the powder layer is fused to a smooth, highly glossy coating.

EXAMPLE 11

Ten g of a synthetic resin powder prepared as in Example 5 are suspended by vigorous stirring with the impeller referred to in Example 1 in 90 g of distilled water containing in solution 0.05 g of sodium lauryl sulphate and 0.1 g of an alkyl phenol polyglycol ether (obtained by reacting 6–9 mol of ethylene oxide with 1 mol of nonyl phenol). To the completed suspension are added 0.1 g of the sodium salt of polyvinyl phosphonic acid.

In the suspension are immersed two steel sheets spaced at a distance of about 3 cm from one another; 25 cm² of the sheet surfaces are covered by the suspension.

By applying a direct voltage of 50 V for 2 minutes at room temperature at a current density of 5 mA/cm² a smooth, uniform powder layer more than 100μ thick is deposited on the sheet connected as the anode; the ratio of the thicknesses of the layers on the front and rear sides of the anode sheet is about 2:1.

By heating for 30 minutes at 185° C the powder layer can be fused to a smooth, glossy coating.

EXAMPLE 12

Ten g of polypropylene with a particle size of less than 10μ are suspended in 90 g of water, containing 0.2 g of sodium lauryl sulphate, 0.1 g of polyvinyl phosphonic acid and 2 g of n-octyl alcohol as defoamers in the manner described in Example 1.

In this suspension are immersed two aluminium sheets spaced at a distance of about 3 cm from one another; 25 cm² of the sheet surface is covered by the suspension. By a direct voltage of 50 V at a current density of 75 mA for 15 seconds at room temperature a precipitate with a layer thickness of 100μ is deposited on the anode. By a subsequent 10 minute treatment at 190° C the precipitate, which has good throwing power, is fused to a smooth coating.

COMPARATIVE TEST

The same suspension as in the previous Example is used except that it contains no polyvinyl phosphonic acid. Depositing takes place as in the previous Example but at a current density of 30 mA.

The subsequent treatment again takes place for 10 minutes at 190° C. However, the coating so obtained is only complete on one side of the electrode.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process, which comprises electrodepositing a synthetic, water-insoluble condensation resin from a suspension of solid particles of said resin in an aqueous medium onto the surface of an electrically conductive article, the particles of the synthetic resin having a size of at least 0.1 μ wherein the suspension also contains polyvinyl phosphonic acid, its sodium salt, phosphoric acid or a combination thereof.

2. A process as claimed in claim 1, wherein the particles of the synthetic resin have a size of at most 30 μ.

3. A process as claimed in claim 1, wherein the particles in the suspension have a size between 0.2 μ and 10 μ.

4. A process as claimed in claim 1, which is carried out at least 10 centigrades below the softening point of the synthetic resin.

5. A process as claimed in claim 1, wherein the synthetic resin is a phenolic resin, a polyester resin or a polyamide or a combination thereof.

6. A process ad claimed in claim 5, wherein the synthetic resin is applied in the form of a powder containing a pigment.

7. A process as claimed in claim 1, wherein the content of powdered synthetic resin in the suspension is from 2 to 50 percent by weight, calculated on the weight of the total suspension.

8. A process as claimed in claim 1, wherein the synthetic resin is a polymer of an olefin having at least three carbon atoms.

9. A process as claimed in claim 1, wherein the synthetic resin is a polymer of an olefin having at least 2 carbon atoms.

10. A process as claimed in claim 1, wherein the polyvinyl phosphonic acid, its sodium salt, phosphoric acid or mixtures of these substances is employed in a quantity of 0.1 to 5 percent by weight, based on the synthetic resin powder.

* * * * *